US012363650B2

(12) United States Patent
Bertizzolo et al.

(10) Patent No.: US 12,363,650 B2
(45) Date of Patent: Jul. 15, 2025

(54) DYNAMIC MAXIMUM TRANSMISSION POWER

(71) Applicant: Apple Inc., Cupertino, CA (US)

(72) Inventors: Lorenzo Bertizzolo, Campbell, CA (US); Ioannis Pefkianakis, San Jose, CA (US); Prashant H Vashi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 397 days.

(21) Appl. No.: 17/720,581

(22) Filed: Apr. 14, 2022

(65) Prior Publication Data

US 2023/0337151 A1    Oct. 19, 2023

(51) Int. Cl.
*H04W 52/36* (2009.01)
*H04W 52/14* (2009.01)
*H04W 52/22* (2009.01)

(52) U.S. Cl.
CPC ....... *H04W 52/367* (2013.01); *H04W 52/146* (2013.01); *H04W 52/221* (2013.01)

(58) Field of Classification Search
CPC .......... H04W 52/367; H04W 52/146; H04W 52/221
USPC ........................................ 370/318
See application file for complete search history.

(56) References Cited

U.S. PATENT DOCUMENTS

| 2019/0230607 | A1 | 7/2019 | Chung | |
| 2022/0386249 | A1* | 12/2022 | Meshkati | H04W 52/44 |
| 2023/0016288 | A1* | 1/2023 | Chauvin | H04W 52/367 |
| 2024/0373463 | A1* | 11/2024 | Furuichi | H04W 74/0875 |

FOREIGN PATENT DOCUMENTS

| EP | 2863689 B1 | 6/2017 |
| WO | 2012094573 A2 | 7/2012 |

* cited by examiner

*Primary Examiner* — Faisal Choudhury
(74) *Attorney, Agent, or Firm* — FLETCHER YODER PC

(57) ABSTRACT

A wireless communication device receives an average transmission power limit for a time period, and determines a first MTPL for a first time of the time period by setting the first MTPL to the average transmission power limit. The wireless communication device then transmits a signal at the first time using a first transmission power not to exceed the first MTPL. If the first transmission power is less than the first MTPL, then the wireless communication device determines residual transmission power based on a difference between the first MTPL and the first transmission power. The wireless communication device determines a second MTPL for a second time of the time period by adding the residual transmission power to the first MTPL. The wireless communication device then transmits a signal at the second transmission power not to exceed the second MTPL.

20 Claims, 12 Drawing Sheets

DYNAMIC MAXIMUM TRANSMISSION POWER

BACKGROUND

The present disclosure relates generally to wireless communication, and more specifically to efficiently transmitting wireless signals.

In a wireless communication device, a transmitter may increase a power of a transmission signal to ensure that a recipient receives the transmission signal with sufficient signal quality and power. To prevent the transmission signal from exceeding regulatory requirements for human exposure, the wireless communication device may decrease the transmission power. However, in some cases, the decrease in transmission power may be excessive.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an electronic device includes a transmitter and processing circuitry communicatively coupled to the transmitter. The processing circuitry receives an average transmission power limit for a time period, determines a fallback transmission power for a subset time period of the time period based on the average transmission power limit and a residual transmission power resulting from a previous transmission, and determines a maximum transmission power limit for the subset time period based on a duty cycle of an executing process. The processing circuitry also causes the transmitter to transmit a signal using a transmission power not to exceed the maximum transmission power limit during the subset time period.

In another embodiment, a method includes receiving, at processing circuitry of a wireless communication device, an average transmission power limit for a time period, determining, using the processing circuitry, a first maximum transmission power limit for a first time interval of the time period based on the average transmission power limit, and transmitting, using a transmitter of the wireless communication device, a first signal at a first transmission power less than the first maximum transmission power limit during the first time interval. The method also includes determining, using the processing circuitry, residual transmission power based on the first maximum transmission power limit and the first transmission power, determining, using the processing circuitry, a second maximum transmission power limit for a second time interval of the time period based on the average transmission power limit and the residual transmission power, and transmitting, using the transmitter, a second signal at a second transmission power during the second time interval of the time period, the second transmission power being based on the second maximum transmission power limit.

In yet another embodiment, one or more tangible, non-transitory, machine-readable media stores instructions that cause processing circuitry to receive an average transmission power limit for a time period, determine a minimum transmission power for a time interval of the time period based on the average transmission power limit and a residual transmission power from a previous signal, and determine a maximum transmission power limit for the time interval based on a duty cycle of an executing process. The instructions also cause the processing circuitry to cause a transmitter to transmit a signal using a transmission power not to exceed the maximum transmission power limit during the time interval.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
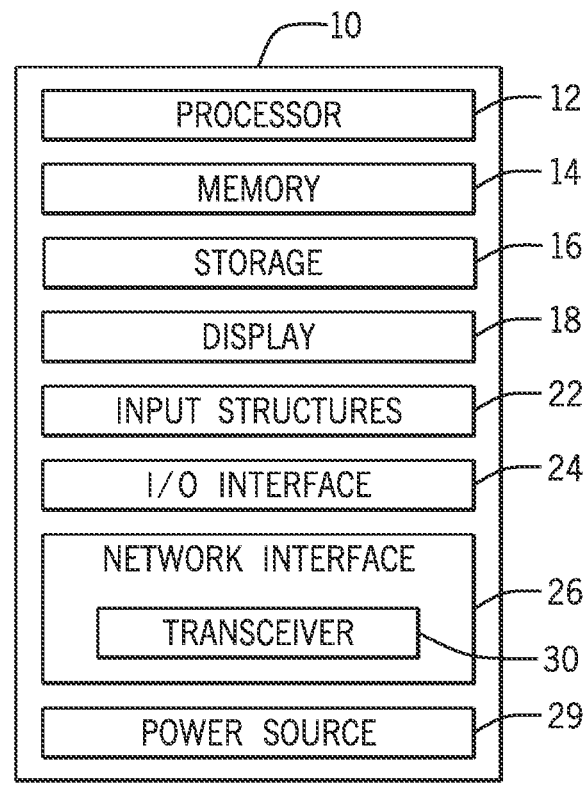
FIG. 1 is a block diagram of an electronic device, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

This disclosure is directed to managing transmission power of a wireless communication device to meet regulatory requirements for human exposure. In particular, the wireless communication device may receive and/or determine an average transmission power limit (e.g., $P_{limit,avg}$) for a time period to meet exposure requirements as promulgated by entities such as the Federal Communication Commission. The wireless communication device may then transmit radio frequency signals with a transmission power that is different (e.g., higher or lower) than the average transmission power limit, but, averaged over the time period, that is less than or equal to the average transmission power limit. For example, in the case of a higher duty cycle, more consistent transmission scheme (e.g., where transmission occurs over approximately the entire time period, greater than or equal to half of the time period, and so on), the wireless communication device may transmit signals at the average transmission power limit. In the case of a lower duty cycle, less frequent, or more sporadic transmission scheme (e.g., where transmission occurs infrequently, less than half of the time period, and so on), the wireless communication device may utilize a higher transmission level (greater than the average transmission power limit), referred to as $P_{max}$, as these higher transmission levels are averaged out by periods of no transmission. In both cases, the average transmission power over the time period is less than or equal to the average transmission power limit.

However, because the wireless communication device does not factor in the transmission power used in previous transmissions (e.g., transmission power consumption) when determining transmission power it will use going forward, there may be a missed opportunity to increase transmission power when possible, while still meeting the average transmission power limit. That is, if less transmission power than the average transmission power limit is used at a first time, then the difference between that less transmission power and the average transmission power limit, referred to herein as "residual" transmission power, may be applied to the next transmission at a second time.

Thus, the embodiments disclosed herein include a wireless communication device that may receive an average transmission power limit for a time period, and determine a first MTPL for a first time of the time period by setting the first MTPL to the average transmission power limit. The wireless communication device may then transmit a signal at the first time using a first transmission power not to exceed the first MTPL. If the first transmission power is less than the first MTPL, then the wireless communication device may determine residual transmission power by taking the difference between the first MTPL and the first transmission power. The wireless communication device may then determine a second MTPL for a second time of the time period by adding the residual transmission power to the first MTPL. The wireless communication device then transmits a signal at the second transmission power not to exceed the second MTPL. In this manner, transmission power may be increased or maximized, thus making wireless communication more efficient and reliable.

FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O)

interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, for a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a satellite network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the electronic device 10 may include any suitable source of power, such as a rechargeable lithium polymer (Li-poly) battery and/or an alternating current (AC) power converter.

Figure 2:
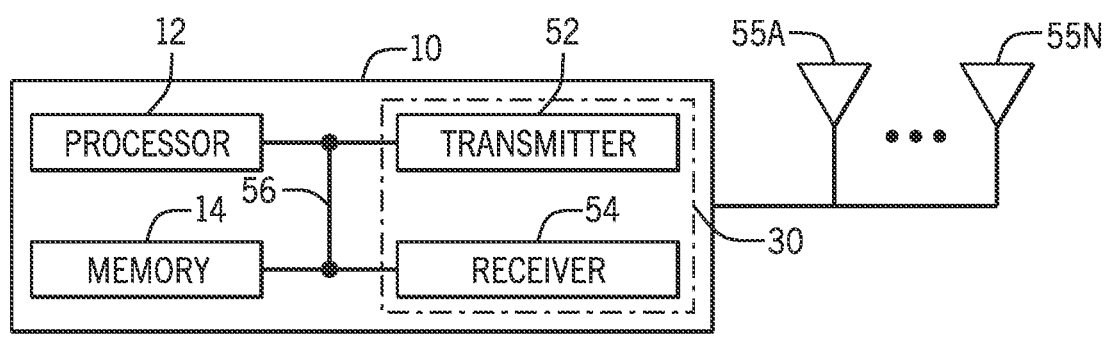
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and an external device via, for example, a network (e.g., including base stations) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
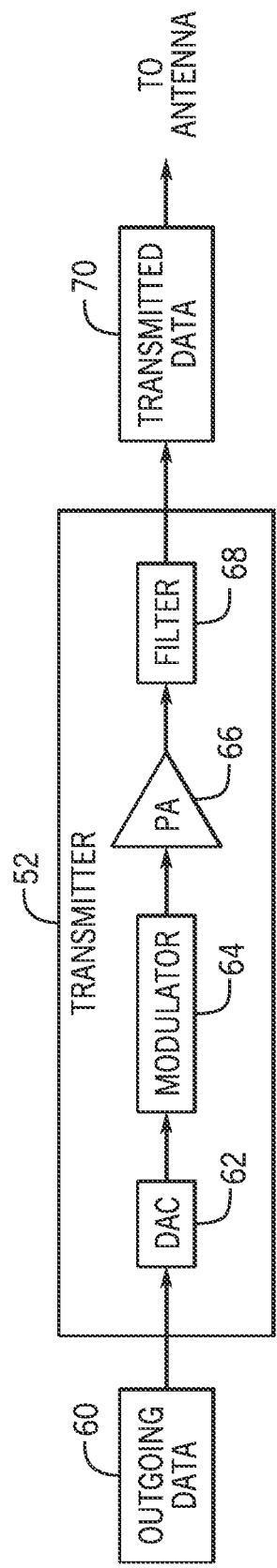
FIG. 3 is a schematic diagram of a transmitter of the electronic device of FIG. 1, according to embodiments of the present disclosure.

FIG. 3 is a schematic diagram of the transmitter 52 (e.g., transmit circuitry), according to embodiments of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 64 may combine the converted analog signal with a carrier signal to generate a radio wave. A power amplifier (PA) 66 receives the modulated signal from the modulator 64. The power amplifier 66 may amplify the modulated signal to a suitable level to drive transmission of the signal via the one or more antennas 55. A filter 68 (e.g., filter circuitry and/or software) of the transmitter 52 may then remove undesirable noise from the amplified signal to generate transmitted data 70 to be transmitted via the one or more antennas 55. The filter 68 may include any suitable filter or filters to remove the undesirable noise from the amplified signal, such as a bandpass filter, a bandstop filter, a low pass filter, a high pass filter, and/or a decimation filter. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the filter 68 if the power amplifier 66 outputs the amplified signal in or approximately in a desired frequency range (such that filtering of the amplified signal may be unnecessary).

Figure 4:
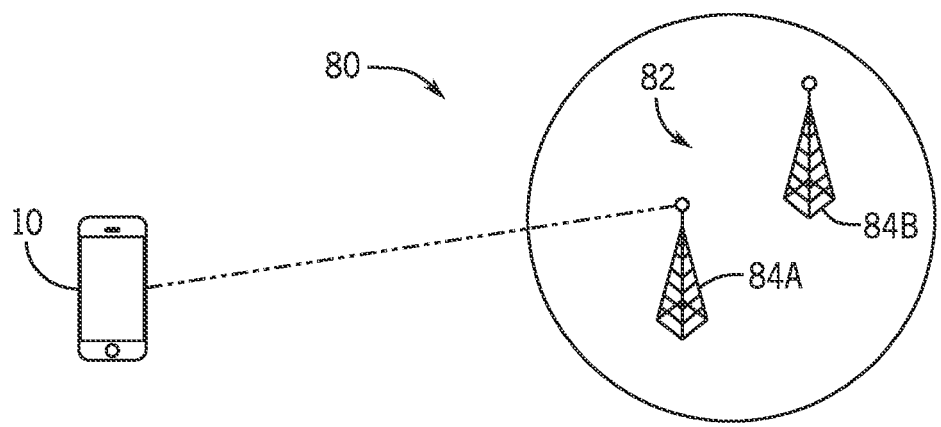
FIG. 4 is a schematic diagram of a wireless communication network supported by a base station and communicatively coupled to the electronic device of FIG. 1, according to an embodiment of the present disclosure.

FIG. 4 is a schematic diagram of a communication system 80 including the electronic device 10 of FIG. 1 communicatively coupled to a wireless communication network 82 supported by base stations 84A, 84B (collectively 84), according to embodiments of the present disclosure. In particular, the base stations 84 may include Next Generation NodeB (gNodeB or gNB) base stations and may provide 5G/New Radio (NR) coverage via the wireless communication network 82 to the electronic device 10, Evolved NodeB (eNodeB) base stations and may provide 4G/LTE coverage via the wireless communication network 82 to the electronic device 10, and/or any other suitable type of base stations to bring any suitable other suitable type of coverage via the wireless communication network 82 to the electronic device 10. The base stations 84 may include any suitable electronic device, such as a communication hub, node, access point, ground station, non-terrestrial base station, and so on, that facilitates, supports, and/or implements the network 82. Each of the electronic device 10 and the base stations 84 may include at least some of the components of the electronic device 10 shown in FIGS. 1 and 2, including one or more processors 12, the memory 14, the storage 16, the transceiver 30, the transmitter 52, the receiver 54, and the associated circuitry shown in FIG. 3. Moreover, the network 82 may include any suitable number of base stations 84 (e.g., one or more base stations 84, four or more base stations 84, ten or more base stations 84, and so on).

Techniques (e.g., autonomous, interactive, or smart techniques) for dynamically setting maximum transmission power may be used to manage transmission power to meet regulatory requirements (e.g., specific absorption rate) for human exposure. Such techniques may be implemented at the level of the electronic device 10, such as by the processor 12 executing instructions stored in the memory 14. For example, a transmission power limit or cap (e.g., a maximum transmission power level (MTPL) may be set or placed on transmission by the transmitter 52 of the electronic device 10 that toggles between a maximum power level (e.g., $P_{max}$) that the transmitter 52 may transmit based on its hardware capabilities, its network configuration, and regulatory requirement, and a fallback or minimum value (e.g., a $P_{min}$) that ensures that an average transmission power during an averaging time window does not exceed a derived limit associated with exposure requirements as promulgated by regulatory entities, such as the Federal Communications Commission.

Benefits of implementing such techniques may include better throughput for lower duty cycle, less frequent, more sporadic, or bursty transmission schemes (e.g., where transmission occurs infrequently, less than half of the time period, and so on), and better uplink coverage for higher duty cycle, more consistent, or non-bursty transmission schemes (e.g., where transmission occurs over approximately the entire time period, greater than or equal to half of the time period, and so on), while ensuring transmission power does not exceed the derived limit associated with exposure requirements. For example, the electronic device 10 may receive and/or determine an average transmission power limit for a time period to meet exposure requirements. The electronic device 10 may then transmit radio frequency signals with a transmission power that is different (e.g., higher or lower) than the average transmission power limit, but, averaged over the time period, that is less than or equal to the average transmission power limit. In the case of the higher duty cycle transmission scheme, the electronic device 10 may transmit signals at the average transmission power limit (e.g., $P_{limit,avg}$). This is because the higher duty cycle, which is closer to constant transmission over the time period, should be limited by the first MTPL. In the case of the lower duty cycle transmission scheme, the electronic device 10 may utilize a higher transmission level (greater than the average transmission power limit, e.g., $P_{max}$), as these higher transmission levels are averaged out by periods of no transmission. In both cases, the average transmission power over the time period is less than or equal to the average transmission power limit.

Without performing techniques to dynamically set maximum transmission power, the electronic device 10 may exhaust the ability to transmit at a maximum power level (e.g., $P_{max}$) without considering of current active software applications and future needs of those applications. This may result in the electronic device 10 being left with very little to no available transmission power, dooming a user to experience dropped calls, poor audio quality, low throughput, and so on. Accordingly, the disclosed embodiments not only perform such techniques, but may also predict a duty cycle of applications executing on the electronic device 10. In particular, for applications that transmit with a lower duty cycle (e.g., where transmission occurs infrequently, less than half of the time period, and so on), the processor 12 may set the MTPL to an increased or maximum power level that the transmitter 52 may transmit based on its hardware capabilities, its network configuration, and regulatory requirement, such as $P_{max}$. For applications that transmit with a higher duty cycle (e.g., where transmission occurs over approximately the entire time period, greater than or equal to half of the time period, and so on), the processor 12 may set the MTPL to a decreased transmission power level, such as average transmission power limit or $P_{limit,avg}$. However, even when performing the techniques to dynamically set maximum transmission power, and factoring in duty cycles of executing software applications, the decrease in transmission power may be excessive, as ongoing transmission power consumption may not be considered.

Accordingly, embodiments herein provide various apparatuses and techniques to efficiently transmit signals by dynamically setting a maximum transmission power level (e.g., MTPL) based on ongoing or previous transmission power consumed by the transmitter 52, among other factors. In particular, the electronic device 10 may receive or determine an average transmission power limit or $P_{limit,avg}$ (e.g., corresponding to exposure requirements) for a time period, and determines a first MTPL for a first time of the time period by setting the first MTPL to the average transmission power limit. The electronic device 10 device may then transmit a signal at the first time using a first transmission power not to exceed the first MTPL. If the first transmission power is less than the first MTPL, then the electronic device 10 device determines residual transmission power based on a difference between the first MTPL and the first transmission power. The electronic device 10 device determines a second MTPL for a second time of the time period by adding the residual transmission power to the first MTPL. The electronic device 10 device then transmits a signal at the second transmission power not to exceed the second MTPL. This process may then repeat for subsequent times of the time period. Moreover, after the time period elapses, the electronic device 10 may repeat this process by resetting a new first MTPL for a first time of the next time period to the average transmission power limit or $P_{limit,avg}$.

Figure 5:
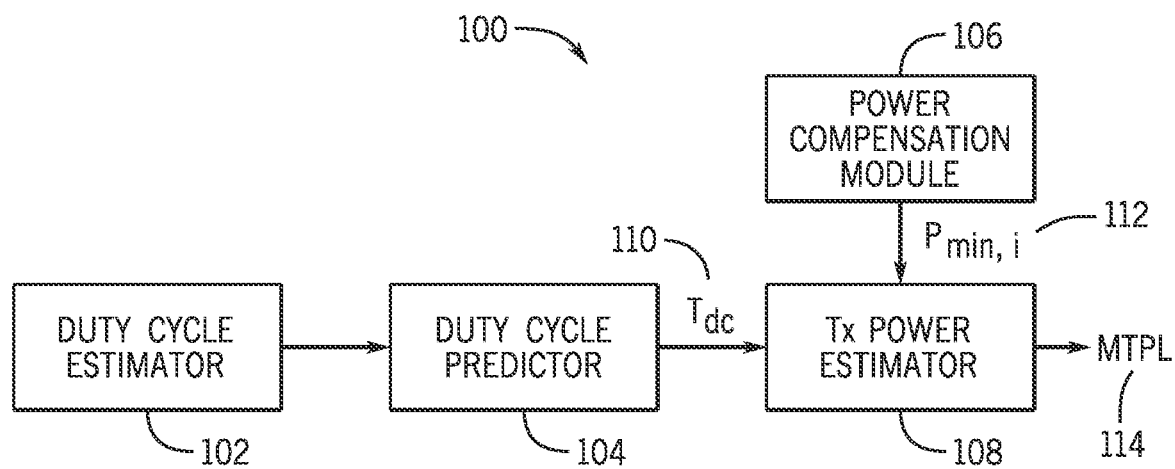
FIG. 5 is a system of modules for dynamically setting a maximum transmission power limit (MTPL) based on ongoing or previous transmission power consumed by the transmitter of FIG. 4, according to embodiments of the present disclosure.

FIG. 5 is a system 100 of modules 102, 104, 106, 108 for dynamically setting the MTPL based on ongoing or previous transmission power consumed by the transmitter 52, according to embodiments of the present disclosure. The modules 102, 104, 106, 108 may be implemented in whole or in part as software, firmware, hardware, and so on. For example, each module 102, 104, 106, 108 may be stored in the form as instructions in the memory 14, and be executable by the processor 12. A duty cycle estimator 102 may estimate duty cycle (e.g., of one or more software applications on the electronic device 10) during one or more past time intervals (e.g., $T_{i-n}$). In some embodiments, the duty cycle estimator 102 may receive or determine baseband packets of uplink traffic, and determine how much traffic associated with the one or more software applications was sent in uplink. Moreover, for a currently executing software application, process, or client on the electronic device 10, the duty cycle estimator 102 may estimate a duty cycle of the application during each past interval $T_{i-1}$, $T_{i-2}$, ... $T_{i-n}$. The duty cycle of the application may refer to a percentage or ratio of time in the interval $T_i$ for which the application causes the transmitter 52 to transmit a signal. Purely as an example, the time interval Ti may be 500 milliseconds (ms), though any suitable time interval is contemplated. As such, for this example, the processor 12 may determine uplink traffic for the last 500 ms, and the duty cycle estimator 102 may estimate duty cycle of one or more software applications, processes, or clients executing on the electronic device 10 for the last time interval $T_{i-1}$ of 500 ms.

A duty cycle predictor 104 may predict a duty cycle $T_{DC}$ 110 (e.g., of one or more software applications on the electronic device 10) for one or more upcoming time intervals (e.g., $T_i$, $T_{i-1}$, $T_{i-2}$, ... $T_{i+n}$). In particular, the duty cycle predictor 104 may a predict duty cycle $T_{DC}$ 110 of a currently executing software application on the electronic device 10 for a future time interval $T_i$ based on the estimated duty cycle of the application estimated by the duty cycle estimator 102 for the past time interval $T_{i-n}$. In some embodiments, the duty cycle predictor 104 may predict a duty cycle $T_{DC}$ 110 of the software application for the next time interval $T_i$ (e.g., the next 500 ms) using any suitable mathematical predictor. For example, the duty cycle predictor 104 may use averaging, machine-learning techniques, pattern recognition and prediction, and so on, to predict the duty cycle of the software application for the next 500 ms based on the estimated duty cycles of the application estimated for the one or more past time intervals $T_{i-n}$. In one embodiments, the duty cycle predictor 104 may use a weighted moving average prediction algorithm to predict the duty cycle of the software application at the next time interval $T_i$ based on the estimated duty cycles of the application estimated for the past time interval $T_{i-1}$. For example, the duty cycle predictor 104 may use the following formula to determine the estimated duty cycles (e.g., estimated active time or $Est_{active}$) of the application at a time interval $T_i$:

$$Est_{active,i} = (1-\alpha) \times Est_{active,i-1} + \alpha \times active \qquad \text{(Equation 1)}$$

where active is a time that the application was active during the past time interval $T_{i-1}$, and $\alpha$ is a constant (e.g., which may range from 0 to 1 and may be fitted for accuracy, such as between 1/16 and 1/4, 1/16 and 3/16, including 1/8). The predicted duty cycle $T_{DC}$ 110 may be a percentage from 0% to 100%, or a ratio from ranging from 0 to 1, corresponding to transmission time for the software application in the next time interval $T_i$. For example, a predicted duty cycle $T_{DC}$ 110 of 0% may mean that there is no transmission for the software application in the next time interval $T_i$, 100% may mean full, constant transmission for the software application in the next time interval $T_i$, 50% may mean transmission for half of the time interval $T_i$ for the software application in the next time interval $T_i$.

A power compensation module 106 may track a consumed transmission power budget of the transmitter 52 and determine and return a residual transmission power $P_{res,i}$ from a last time interval $T_{i-1}$ (e.g., to be applied to a next time interval $T_i$) and/or a fallback or minimum transmission power $P_{min,i}$ 112 for the next time interval $T_i$ that ensures that an average transmission power during an averaging time window does not exceed a derived limit associated with exposure requirements. As described in further detail below, an MTPL 114 for the next time interval $T_i$ may be determined based on the minimum transmission power $P_{min,i}$ 112. The residual transmission power $P_{res,i}$ may be a remaining or residual transmission power if a previous transmission power was less than a previous, corresponding MTPL (e.g., such that the residual transmission power $P_{res,i}$ may be added to a current or future transmission power and/or MTPL 114 without exceeding an emission limit) during the time period $T_i$.

In particular, a time interval T corresponds to an average transmission power limit or $P_{limit,avg}$ associated with exposure requirements as promulgated by regulatory entities, such as the Federal Communications Commission. Using Frequency Range 1 (FR1) of the 5G/NR specification as an example, T may be 100 seconds, though any suitable time interval is contemplated (e.g., 10 seconds or more, 60 seconds or more 100 seconds or more, 200 seconds or more, and so on). Because the electronic device 10 may not be synchronized with T (e.g., the processor 12 does not know when T starts or ends), a time interval T1 is defined, that is less than T, such that it is ensured that meeting the average transmission power limit over the smaller time interval T1 may meet the average transmission power limit over the larger time interval T. It should be understood that any suitable time interval is contemplated for T1 (e.g., 1 second or more, 10 seconds or more, 60 seconds or more, and so on), and, indeed, the disclosed embodiments may be performed for the time interval T, rather than the subinterval T1.

The time interval T1 may be further divided into smaller time intervals $T_i$, each of which a corresponding $MTPL_i$ 114 may be generated by the system 100. That is, each of the modules 102, 104, 106, 108 may generate their respective outputs, including the duty cycle $T_{DC}$ 110, the minimum transmission power $P_{min,i}$ 112, and/or the MTPL 114, for each time interval $T_i$. As an example, the time interval $T_i$ may be 500 ms, though any suitable time interval is contemplated (e.g., 1 ms or more, 10 ms or more, 100 ms or more 500 ms or more, 1 second or more, 5 seconds or more, and so on). Indeed, the power compensation module 106 may determine the residual transmission power $P_{res,i}$ for each time interval $T_i$, which may be a power consumed $P_{c,i-1}$ at a previous or last time interval $T_{i-1}$. In some embodiments, the power compensation module 106 may determine the consumed transmission power $P_c$ by receiving uplink power allocation from baseband packets and determining the consumed power $P_{c,i}$ for a time interval $T_i$ based on the uplink power allocation, though the power compensation module 106 may use any other suitable technique to determine the consumed transmission power $P_c$. The power compensation module 106 may also determine a $P_{limit,i}$ for the time interval $T_i$, which may be the average transmission power associated with exposure requirements, and from which the $P_{min,i}$ 112, and ultimately $MTPL_i$ 114 (e.g., that may be enforced from $T_i$ to $T_{i+1}$), may depend.

In particular, the (e.g., initial) available transmission power budget $P_{avail,i}$ at $T_i$ may be expressed as:

$$P_{avail,i}=T_i \times P_{limit} \quad \text{(Equation 2)}$$

where $P_{limit,avg}$ is the average power associated with exposure requirements for a time period, such as T or T1. As such, the transmission power budget remaining from previous transmission(s) (e.g., from at least time $T_{i-1}$) or residual transmission power $P_{res,i}$ for each time interval $T_i$ may be defined as the difference between the available transmission power budget $P_{avail,i}$ at Ti and the power $P_{c,i-1}$ consumed from previous transmission(s) (e.g., at time $T_{i-1}$):

$$P_{res,i}=T_i \cdot P_{limit} - P_{c,i-1} \quad \text{(Equation 3)}$$

The power $P_{c,i-1}$ consumed so far in the time interval T1 is the summation of the transmission power $P_k$ consumed thus far in time slot k (e.g., having a duration of $T_i$ within the time interval T1), and may be defined as:

$$P_{c,i-1}=\Sigma_{k \in T_{i-1}} P_k \quad \text{(Equation 4)}$$

It should be noted that, when a previous time interval T1 transitions to a new time interval T1, such that i is 0 and the time interval is at $T_{i=0}$, the residual power $P_{res,i}$ is also 0, the time interval $T_i$ is reset and there is no previous time interval $T_{i-1}$ for power to be consumed. In some embodiments, the residual power $P_{res,i}$ may be negative, as $P_{limit,avg}$ is enforced for the larger time interval T, and $T_i$ is less than $T_1$, which is less than T.

With the foregoing in mind then, the average transmission power limit for the time interval $T_i$, or $P_{limit,i}$, may be defined as:

$$P_{limit,i} = P_{limit} + \frac{P_{res,i}}{T_i} \quad \text{(Equation 5)}$$

The power compensation module 106 may then determine the minimum transmission power $P_{min,i}$ 112 for the time interval $T_i$ that ensures that an average transmission power during T or T1 does not exceed a derived limit associated with exposure requirements using $P_{limit,i}$. In particular, the power compensation module 106 may determine the minimum transmission power $P_{min,i}$ 112 based on the type of traffic that the transmitter 52 is attempting to transmit (e.g., low duty cycle traffic, high duty cycle traffic). In some embodiments, the power compensation module 106 may receive or determine baseband packets of uplink traffic, and determine the type of traffic that was sent in uplink. The uplink traffic may include or may not include the software application(s) for which the duty cycle predictor 104 predicted the duty cycle $T_{DC}$ 110. For example, for traffic that is generally associated with lower duty cycles (e.g., voice over Internet Protocol (VoIP), voice over LTE), such that the associated duty cycles is less than or equal to a threshold value (e.g., of 0.3 or more, 0.5 or more, 0.7 or more, such as 0.5), the power compensation module 106 may set the minimum transmission power $P_{min,i}$ 112 to $P_{limit,i}$ to ensure that transmission power may not fall under $P_{limit,avg}$. On the other hand, for traffic associated with higher duty cycles (e.g., streaming applications, video conferencing applications, and so on), such that the associated duty cycles exceeds the threshold value, the power compensation module 106 may set the minimum transmission power $P_{min,i}$ 112 to the greater of $P_{limit,i}$ and a difference between $P_{max}$ and a constant k (e.g., 1 decibels (dB) or more, 2 dB or more, 3 dB or more, 4 dB or more, 5 dB or more, and so on, such as 3 dB), as expressed in below:

$$P_{min}=\max \{P_{limit}, P_{max}-k\} \quad \text{(Equation 6)}$$

In some embodiments, the lower duty cycle may be associated with traffic that has a data rate of less than or equal to a threshold value (e.g., 1 megabits per second (Mbps) or more, 2 Mbps, or more, 3 Mbps or more, and so on), while the higher duty cycle may be associated with traffic that has a data rate of greater than the threshold value.

A transmit power estimator 108 may estimate the $MTPL_i$ 114 for the time period $T_i$ between the range from $P_{min,i}$ 112 to $P_{max}$ proportionally to the duty cycle $T_{DC}$ 110. As mentioned above, $MTPL_i$ 114 may be an upper bound of the transmission power consumption of the electronic device 10 for the time period Ti (e.g., for the next 500 ms). In particular, the transmit power estimator 108 may determine the MTPL$_i$ 114 based on P$_{max}$, P$_{min,i}$ 112, and the predicted duty cycle T$_{DC}$ 110. Because P$_{max}$ is the maximum transmission power of electronic device 10 based on hardware capabilities of the electronic device 10, a network configuration of the electronic device 10, and/or regulatory requirements, it is fixed, such that it is constant for a given configuration of the electronic device 10. As noted above, P$_{min,i}$ 112 is determined based on the type of traffic that the transmitter 52 is attempting to transmit (e.g., low duty cycle traffic, high duty cycle traffic), and consumed power budget P$_c$ of the transmitter 52, and each time interval T$_i$. Specifically, the transmit power estimator 108 may determine the MTPL$_i$ 114 based on a percentage or ratio corresponding to the duty cycle prediction T$_{DC}$ and the time interval for which the duty cycle prediction Mc was made (e.g., T$_i$). That is, the transmit power estimator 108 may set the MTPL$_i$ 114 between P$_{min,i}$ 112 and P$_{max}$ in a linear fashion based on the duty cycle prediction T$_{dc}$, such as using the formula below (assuming that the duty cycle prediction T$_{DC}$ was made over the time interval T$_i$):

$$MTPL_i = P_{max} - \frac{T_{DC}}{T_i} \times (P_{max} - P_{min,i}) \qquad \text{(Equation 7)}$$

For example, if the duty cycle T$_{DC}$ 110 is 70%, the MTPL$_i$ 114 is set to a difference of P$_{max}$ and a product of 70% and a difference between P$_{max}$ and P$_{min,i}$ 112. If the duty cycle T$_{DC}$ 110 is 30%, the MTPL$_i$ 114 is set to a difference of P$_{max}$ and a product of 30% and a difference between P$_{max}$ and P$_{min,i}$ 112.

In this manner, the system 100 may determine the MTPL$_i$ 114 for a time interval T$_i$ based on consumed power budget P$_{c,i}$, since the MTPL$_i$ 114 is based on P$_{min,i}$ 112, which is updated every time interval T$_i$ based on the consumed power budget P$_{c,i}$ for the previous time interval T$_{i-1}$. As discussed, the range of P$_{min,i}$ to P$_{max}$, from which MTPL is derived, may change every time interval T$_i$. Indeed, without the power compensation module 106, P$_{min}$ may be determined only based on the type of traffic that the transmitter 52 is trying to transmit, without considering power consumption P$_c$, and thus may leave unused power budget on the table, when it could be used instead. Thus, factoring in power consumption P$_c$ may increase transmission power efficiency of the electronic device 10, while still complying with emission regulations. Moreover, the disclosed techniques may apply to any suitable radio access technologies, such as 4G/LTE, 5G/NR, 5G+ (e.g., 6G), and so on.

Figure 6:
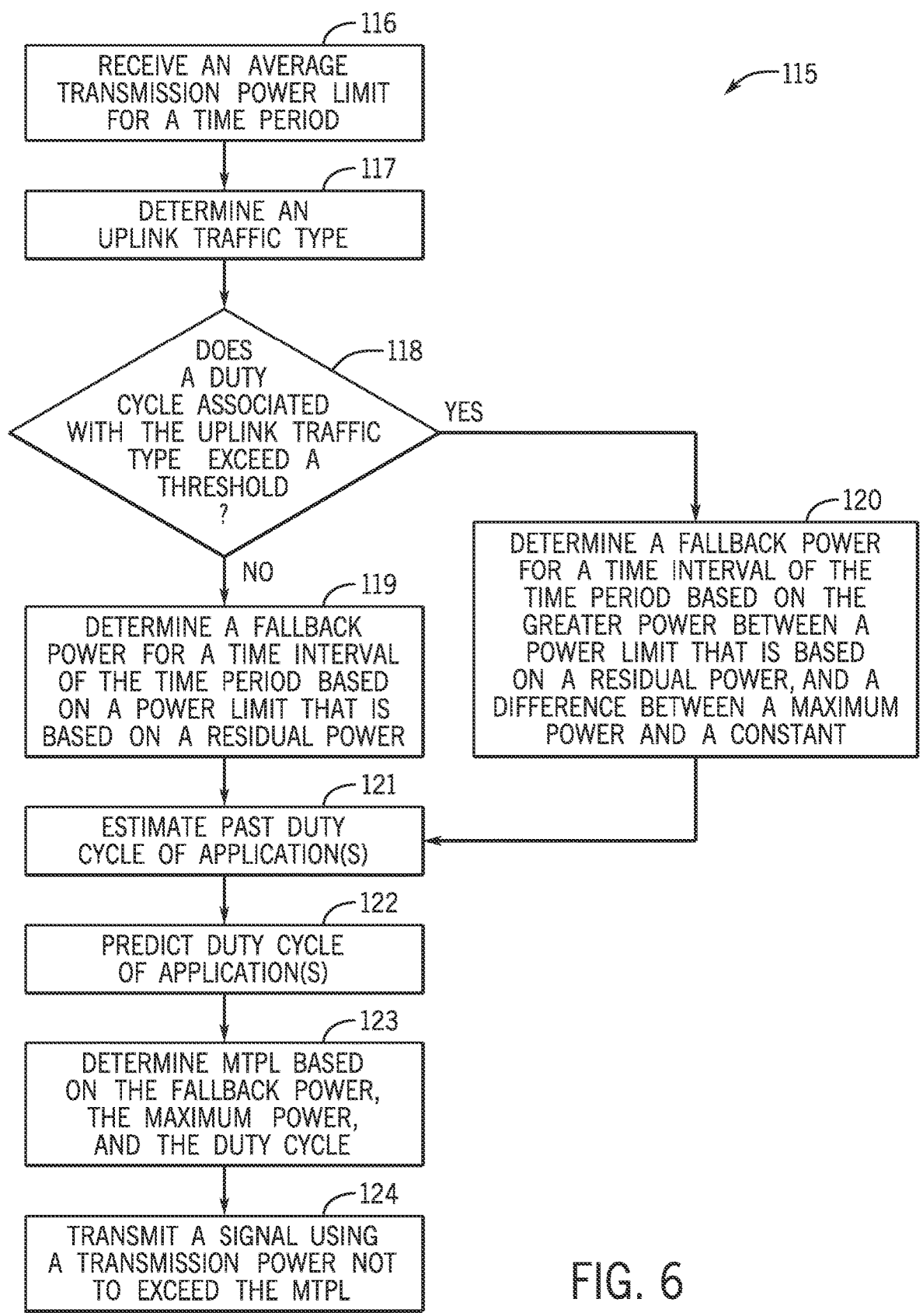
FIG. 6 is a method for dynamically setting the MTPL based on ongoing or previous transmission power consumed by the transmitter of FIG. 4, according to embodiments of the present disclosure.

FIG. 6 is a method 115 for dynamically setting the MTPL 114 based on ongoing or previous transmission power consumed P$_c$ by the transmitter 52, according to embodiments of the present disclosure. Any suitable device (e.g., a controller) that may control components of the electronic device 10, such as the processor 12, may perform the method 115. In some embodiments, the method 115 may be implemented by executing instructions stored in a tangible, non-transitory, computer-readable medium, such as the memory 14 or storage 16, using the processor 12. For example, the method 115 may be performed at least in part by one or more software components, such as an operating system of the electronic device 10, one or more software applications of the electronic device 10, and the like. While the method 115 is described using steps in a specific sequence, it should be understood that the present disclosure contemplates that the described steps may be performed in different sequences than the sequence illustrated, and certain described steps may be skipped or not performed altogether.

In process block 116, the processor 12 of the electronic device 10 receives an average transmission power limit or P$_{limit,avg}$ for a time period T. In particular, the average transmission power limit may correspond to exposure requirements as promulgated by regulatory entities for a time averaging window (e.g., T). In process block 117, the processor 12 determines an uplink traffic type, and, in decision block 118, determines whether a duty cycle associated with uplink traffic type exceeds a threshold. In particular, as described above, the power compensation module 106 may determine the type of traffic that the transmitter 52 is attempting to transmit, and determine whether the traffic is low duty cycle traffic or high duty cycle traffic by comparing a duty cycle associated with the traffic to a threshold value (e.g., of 0.3 or more, 0.5 or more, 0.7 or more, such as 0.5), or determining a data rate or throughput of the traffic type and comparing to a threshold value.

If the processor 12 determines that the duty cycle associated with the traffic does not exceed the threshold, then, in process block 119, the processor 12 determines the fallback or minimum transmission power P$_{min,i}$ 112 based on the dynamic power limit P$_{limit,\ i}$ 136 for the time period T$_i$, which is determined based on the consumed power P$_{c,i}$/the residual power P$_{res,i}$, as shown in Equation 5 above, to ensure that transmission power may not fall under P$_{limit,avg}$. For example, the traffic may be lower duty cycle traffic, such as VoIP and/or VoNR traffic. On the other hand, for traffic associated with higher duty cycles (e.g., streaming applications, video conferencing applications, and so on), such that the associated duty cycles exceeds the threshold value, the processor 12, in process block 120, determines the fallback or minimum transmission power P$_{min,i}$ 112 based on the greater of P$_{limit,i}$ and a difference between P$_{max}$ and a constant k (e.g., 1 decibels (dB) or more, 2 dB or more, 3 dB or more, 4 dB or more, 5 dB or more, and so on, such as 3 dB), as shown in Equation 6.

In process block 121, the processor 12 estimates one or more past duty cycles of one or more executing software applications, processes, and/or clients on the electronic device 10. In particular, this may be performed by the duty cycle estimator 102, as described above. In process block 122, the processor 12 predicts a future duty cycle of the one or more executing software applications on the electronic device 10. In particular, this may be performed by the duty cycle predictor 104, as described above. In process block 123, the processor 12 determines the MTPL 114 based on the fallback or minimum transmission power P$_{min,i}$ 112, the maximum power P$_{max}$, and the predicted duty cycle. In particular, the processor 12 may set the MTPL 114 between the fallback or minimum transmission power P$_{min,i}$ 112 and the maximum power P$_{max}$ based on the predicted duty cycle. For example, the transmit power estimator 108 may determine the MTPL$_1$ 114 based on a percentage or ratio corresponding to the duty cycle prediction T$_{DC}$ and the time interval for which the duty cycle prediction T$_{DC}$ was made (e.g., T$_i$), as described above. That is, the transmit power estimator 108 may set the MTPL$_i$ 114 between P$_{min,i}$ 112 and P$_{max}$ in a linear fashion based on the duty cycle prediction T$_{dc}$, such as using Equation 7 above (e.g., based on a linear relationship between P$_{min,i}$ 112, P$_{max}$, and the duty cycle prediction T$_{dc}$. In process block 124, the processor 12 causes the transmitter 52 to transmit a signal using a transmission power P$_c$ not to exceed the MTPL$_1$ 114. In this manner, the method 115 enables the processor 12 to dynamically set the MTPL 114 based on ongoing or previous transmission power consumed $P_c$ by the transmitter 52, increasing transmission power efficiency of the electronic device 10, while still complying with emission regulations.

Figure 7:
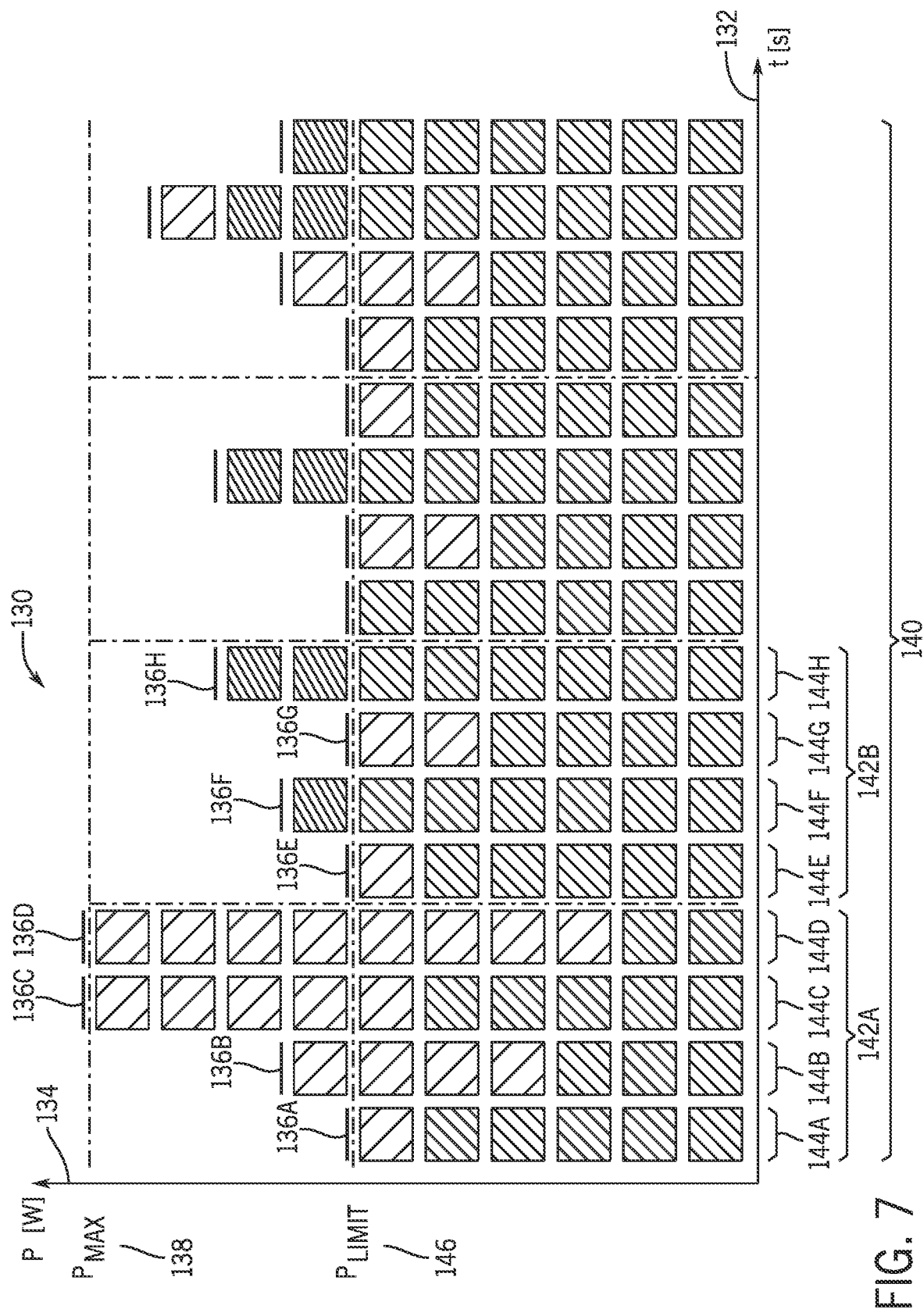
FIG. 7 is a plot illustrating dynamically setting the MTPL based on ongoing or previous transmission power consumed by the transmitter of FIG. 4 when uplink traffic is associated with a lower duty cycle and duty cycle is predicted at 100%, according to embodiments of the present disclosure.

FIG. 7 is a plot 130 illustrating dynamically setting the MTPL 114 based on ongoing or previous transmission power consumed $P_c$ by the transmitter 52 when traffic is associated with a lower duty cycle and duty cycle $T_{DC}$ 110 is predicted at 100%, according to embodiments of the present disclosure. The plot 130 includes a horizontal or x-axis 132 representing time in seconds, and a vertical or y-axis 134 represent transmission power in watts. To simplify explanation, the example shown in the plot 130 illustrates traffic associated with a lower duty cycle (e.g., a VoIP scenario), such that the power compensation module 106 sets the minimum transmission power $P_{min,i}$ 112 that ensures that an average transmission power during T or T1 does not exceed a derived limit associated with exposure requirements to $P_{limit,i}$ (e.g., 136A-H, collectively 136), and the duty cycle predictor 104 predicts a duty cycle $T_{DC}$ 110 of 100%, such that the transmit power estimator 108 sets the MTPL$_i$ 114 to $P_{min,i}$ 112, per Equation 7 above. The example shown in the plot 130 also assumes that the time interval T 140 is 16 time slots, the time interval T1 (e.g., 142A-B, collectively 142) is four time slots, and the time interval $T_i$ (e.g., 144A-H, collectively 144) is one time slot.

As illustrated, for a first time interval T1 142A of the time interval T 140, at time interval or slot $T_0$ 144A, the consumed or used transmission power $P_{c,0}$ is 1 W less than $P_{limit,0}$ 136A. It should be understood that the power units in the plot 130 are used for ease of explanation, and actual values may vary with implementation. Additionally, the residual power $P_{res,0}$ at $T_0$ 144A is 0, as at To 144A, and each $T_0$ 144 at the start of each T1 142, $P_{limit,i}$ 136 is set to $P_{limit,avg}$ 146 (e.g., the average transmission power limit over the time interval T 140 and/or T1 142), and $P_{res,0}$ is set to 0. However, for the next time slot T1 144B, the residual power $P_{res,1}$ may be set to the remaining transmission power between the consumed transmission power $P_{c,0}$ and the $P_{limit,0}$ 136A, or 1 W.

As such, at the second time slot $T_1$ 144B, the residual power $P_{res,1}$ is 1 W, and $P_{limit,1}$ 136B may be set to the sum of $P_{limit,0}$ 136A and $P_{res,1}$ per Equation 5 above. As shown, at the second time slot $T_1$ 144B, the consumed or used transmission power $P_{c,1}$ is 4 W less than $P_{limit,1}$ 136B. Accordingly, the residual power $P_{res,2}$ at third time slot $T_2$ 144C may be set to 4 W. Thus, at third time slot $T_2$ 144C, $P_{limit,2}$ 136C may be set to the sum of $P_{limit,1}$ 136B and $P_{res,2}$—not to exceed $P_{max}$ 138 (e.g., as the transmitter 52 may not be capable of transmitting at a power beyond $P_{max}$ 138). As such, $P_{limit,2}$ 136C may be set to $P_{max}$ 138. As shown, at the third time slot $T_2$ 144C, the consumed or used transmission power $P_{c,2}$ is 5 W less than $P_{limit,2}$ 136C. Accordingly, the residual power $P_{res,3}$ at fourth time slot $T_3$ 144D may be set to 5 W. At the fourth time slot $T_3$ 144D, $P_{limit,3}$ 136D may be set to the sum of $P_{limit,2}$ 136C and $P_{res,3}$—not to exceed $P_{max}$ 138. As such, $P_{limit,3}$ 136D may be set to $P_{max}$ 138. As previously noted, because the current time interval $T_1$ 142A transitions to a new time interval $T_1$ 142B after the fourth time slot $T_3$ 144D, $P_{limit,0}$ 136E for a first time slot $T_0$ 144E is reset to $P_{limit,avg}$ 146.

In this manner, the MTPL$_i$ 114 (e.g., which is set to $P_{min,i}$ 112, which in turn is set to $P_{limit, i}$ 136) may be dynamically set based on ongoing or previous transmission power consumed $P_c$ by the transmitter 52 when, for example, traffic is associated with a lower duty cycle and duty cycle $T_{DC}$ 110 is predicted at 100%, increasing transmission power efficiency of the electronic device 10, while still complying with emission regulations. Indeed, as shown at second and fourth time slots $T_1$ 144F and $T_3$ 144G, respectively, of the second time interval $T_1$ 142B, the transmitter 52 may use or consume transmission powers $P_c$ greater than the average transmission power limit or $P_{limit,avg}$ 146 corresponding to exposure requirements for the time interval T 140, due to the disclosed embodiments enabling the $P_{limit,1}$ 136F and $P_{limit,3}$ 136H for the time slots $T_1$ 144F and $T_3$ 144G to exceed the $P_{limit,avg}$ 146. That is, without dynamically setting the MTPL$_i$ 114 for each time interval $T_i$ 144, the MTPL$_i$ 114 may be capped at the static average transmission power limit or $P_{limit,avg}$ 146 for the time interval T 140 or $T_1$ 142.

Figure 8:
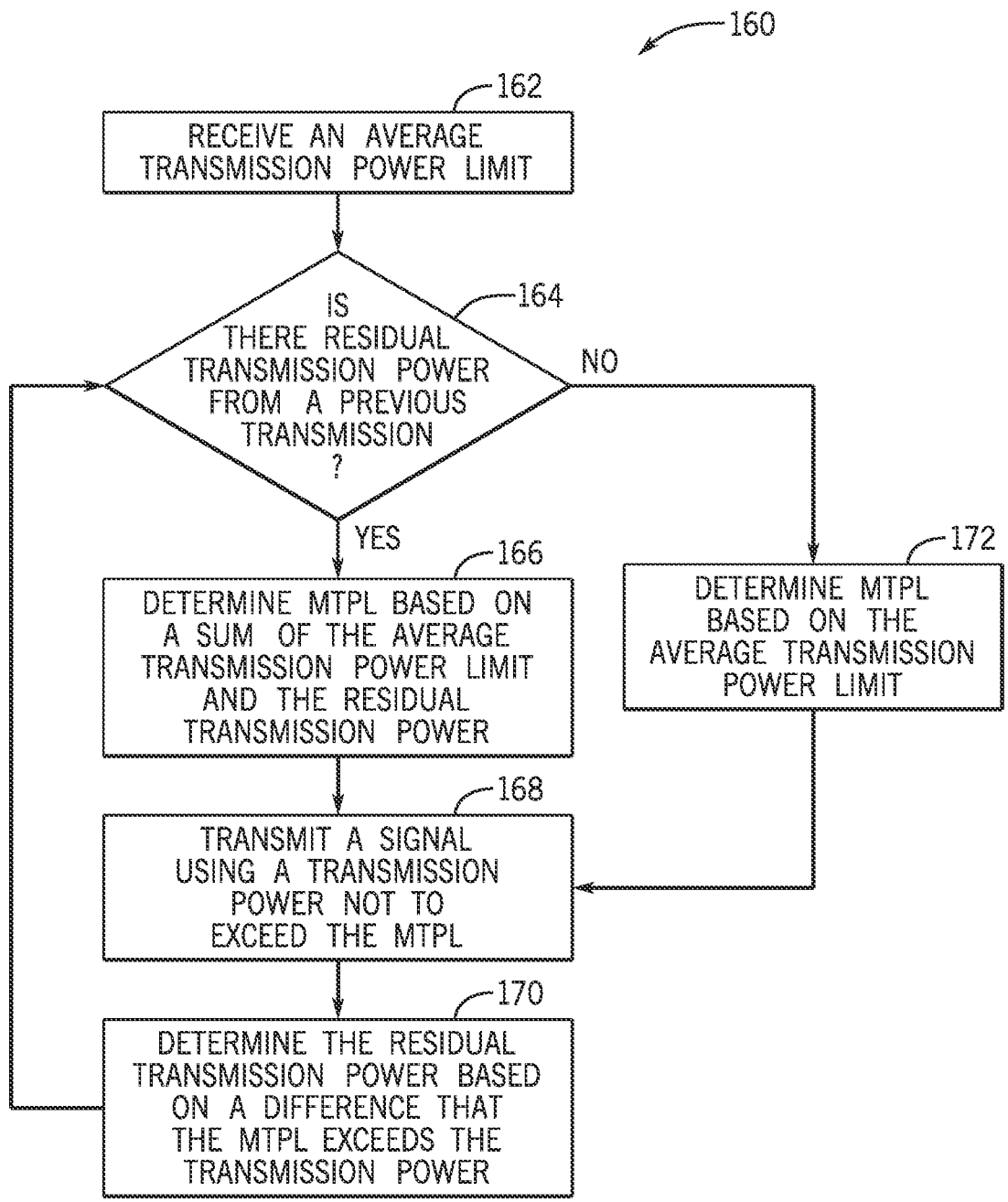
FIG. 8 is a method for dynamically setting the MTPL based on ongoing or previous transmission power consumed by the transmitter of FIG. 4 when uplink traffic is associated with a lower duty cycle and duty cycle is predicted at 100%, according to embodiments of the present disclosure.

FIG. 8 is a flowchart of a method 160 for dynamically setting the MTPL 114 based on ongoing or previous transmission power consumed $P_c$ by the transmitter 52 when traffic is associated with a lower duty cycle and duty cycle $T_{DC}$ 110 is predicted at 100%, according to embodiments of the present disclosure. Any suitable device (e.g., a controller) that may control components of the electronic device 10, such as the processor 12, may perform the method 160. In some embodiments, the method 160 may be implemented by executing instructions stored in a tangible, non-transitory, computer-readable medium, such as the memory 14 or storage 16, using the processor 12. For example, the method 160 may be performed at least in part by one or more software components, such as an operating system of the electronic device 10, one or more software applications of the electronic device 10, and the like. While the method 160 is described using steps in a specific sequence, it should be understood that the present disclosure contemplates that the described steps may be performed in different sequences than the sequence illustrated, and certain described steps may be skipped or not performed altogether.

In process block 162, the processor 12 of the electronic device 10 receives an average transmission power limit or $P_{limit,avg}$ 146. In particular, the average transmission power limit 146 may correspond to exposure requirements as promulgated by regulatory entities for the time interval T 140. In decision block 164, the processor determines whether there is a residual transmission power $P_{res,i}$ from a previous transmission. That is, for a current time slot $T_i$ of a time interval T 140, the processor 12 may determine if there is a residual transmission power $P_{res,i}$ from a transmission performed during a previous time slot $T_{i-1}$. As mentioned above, in cases where the time slots $T_i$ have been reset due to transition to a new time interval $T_1$ 142 or new time interval T 140, there may be no residual transmission power $P_{res,i}$. Additionally, where the consumed transmission power reached a level of or was equal to a previous $P_{limit,i-1}$ 136 for the previous time slot $T_{i-1}$, there may also be no residual transmission power $P_{res,i}$.

If there is a residual transmission power $P_{res,i}$ from a previous transmission, then, in process block 166, the processor 12 determines the MTPL$_i$ 114 based on a sum of the average transmission power limit 146 and the residual transmission power $P_{res,i}$. For example, the processor 12 may set the MTPL$_i$ 114 to a sum of the average transmission power limit 146 and the residual transmission power $P_{res,i}$, per Equation 5. In particular, this may occur in cases where the MTPL$_i$ 114 is set to $P_{min,i}$ 112 (e.g., when the duty cycle predictor 104 predicts a higher duty cycle $T_{DC}$ 110, such as a 100% duty cycle), which in turn is set to $P_{limit,i}$ 136 (e.g., when there is traffic associate with lower duty cycle transmission, such as a VoIP scenario). In process block 168, the processor 12 causes the transmitter 52 to transmit a signal using a transmission power $P_{c,i}$ not to exceed the MTPL$_1$ 114. In process block 170, the processor 12 determines the residual power $P_{res,i+1}$ for time slot $T_{i+1}$ based on a difference that the $MTPL_i$ 114 exceeds the consumed transmission power $P_{c,i}$ for the time slot $T_i$. For example, the processor 12 may set the residual power $P_{res,i+1}$ for time slot $T_{i+1}$ to a difference that the $MTPL_i$ 114 exceeds the consumed transmission power $P_{c,i}$ for the time slot $T_i$. The method 160 may the return to decision block 164 for the next time slot $T_{i+1}$. As noted above, if the time slot is a transition to a new time interval $T_1$ 142 or new time interval T 140, then the residual power $P_{res,i+1}$ may be set to 0.

Returning to decision block 164, if the processor 12 determines that there is no residual transmission power $P_{res,i}$ from a previous transmission, then, in process block 172, the processor 12 determines the $MTPL_i$ 114 based on the average transmission power limit 146 (e.g., sets the $MTPL_i$ 114 to the average transmission power limit 146), and, in process block 168, the processor 12 causes the transmitter 52 to transmit a signal using a transmission power $P_{c,i}$ not to exceed the average transmission power limit 146. The method 160 then continues to process block 170. In this manner, the method 160 enables the processor 12 to dynamically set the MTPL 114 based on ongoing or previous transmission power consumed $P_c$ by the transmitter 52 when, for example, traffic is associated with a lower duty cycle and duty cycle $T_{DC}$ 110 is predicted at 100%, increasing transmission power efficiency of the electronic device 10, while still complying with emission regulations.

Figure 9A:
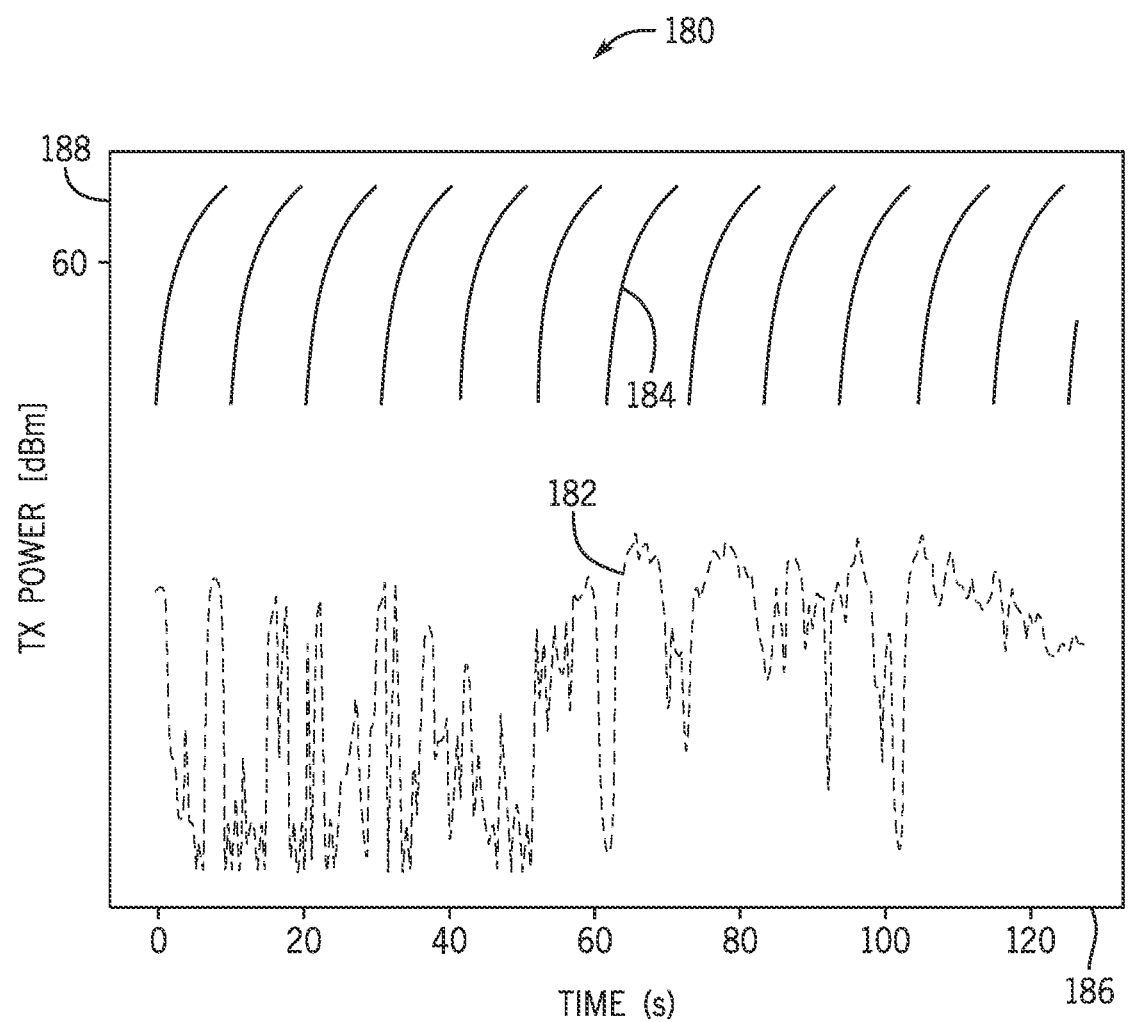
FIG. 9A is a timing diagram illustrating consumed power and residual power over time, wherein the residual power is reset every 10 seconds, according to embodiments of the present disclosure.
Figure 9B:
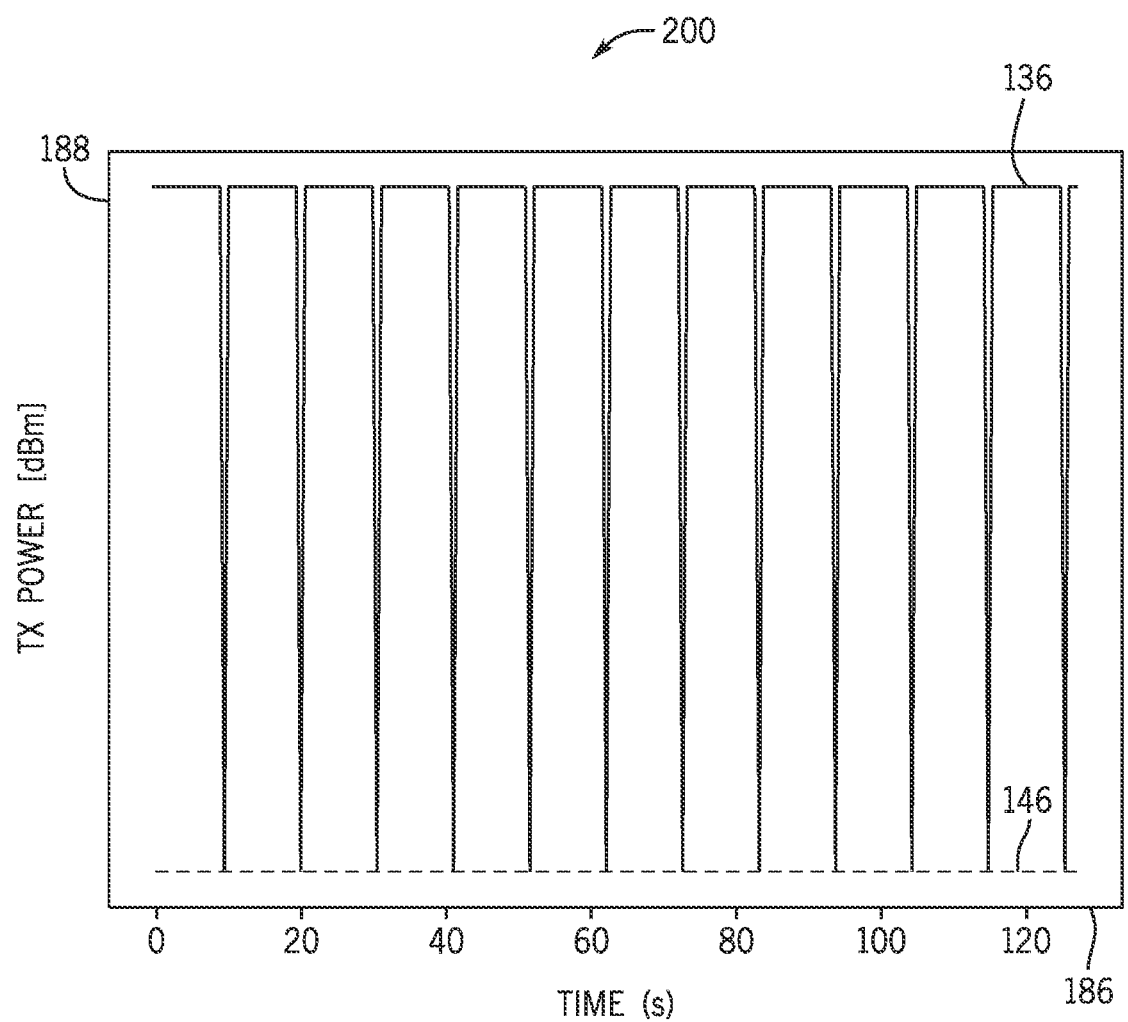
FIG. 9B is a timing diagram illustrating a dynamic power limit for a time interval $T_i$ and an average transmission power limit over time, where the residual power is reset every time 10 seconds, according to embodiments of the present disclosure.
Figure 9C:
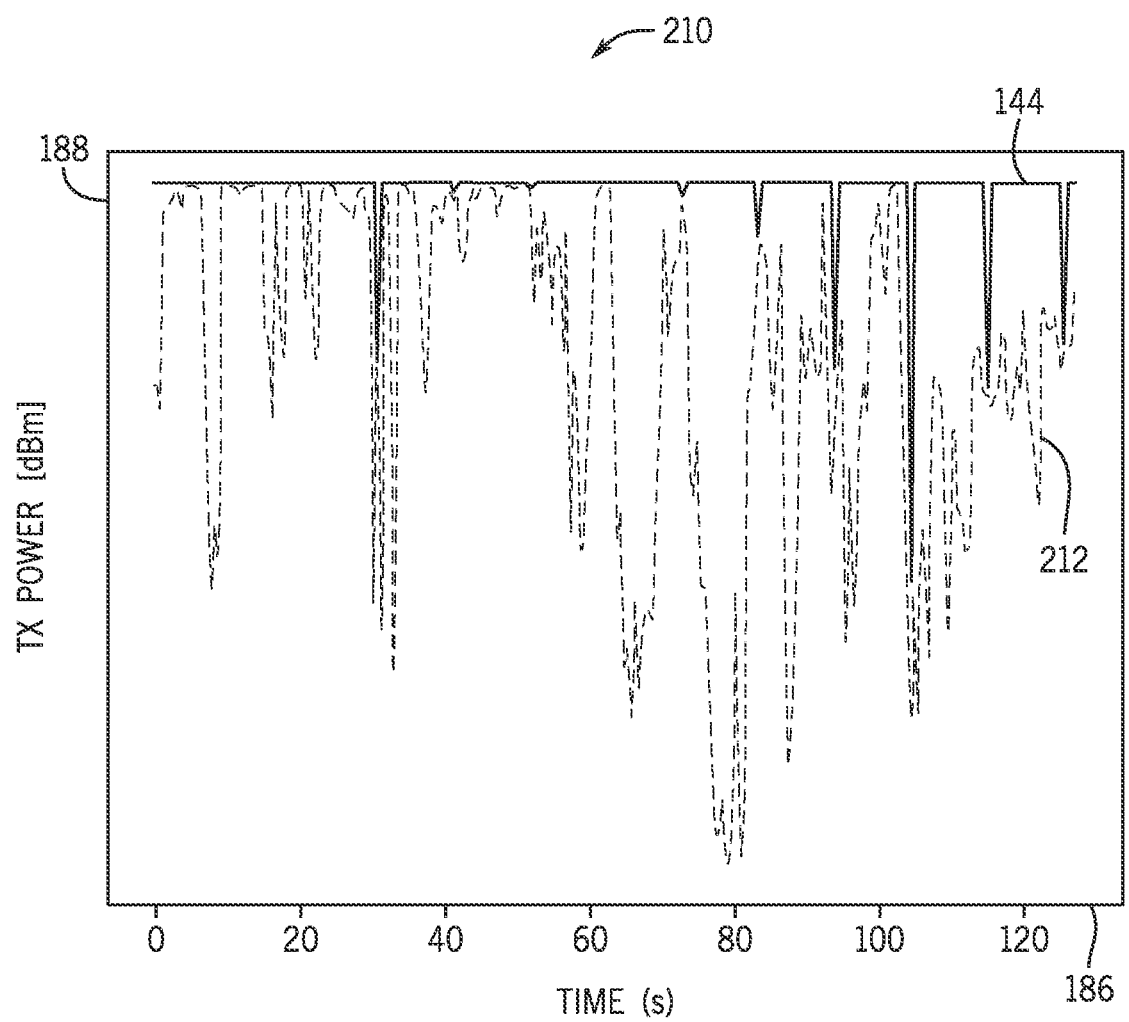
FIG. 9C is a timing diagram illustrating the MTPL that may be determined based on consumed power and/or residual power that is reset every 10 seconds, and an MTPL that may be determined without considering consumed power and/or residual power, according to embodiments of the present disclosure.

FIGS. 9A-C illustrate operating characteristics when dynamically setting the MTPL 114 based on ongoing or previous transmission power consumed by the transmitter of FIG. 4 for a low traffic scenario, wherein the residual power $P_{res}$ 184 is reset every 10 seconds, according to embodiments of the present disclosure. That is, the time interval $T_1$ 142 is set at 10 seconds. The low traffic scenario may include, for example, operation of a web browser. FIG. 9A is a timing diagram 180 illustrating consumed power $C_p$ 182 and residual power $P_{res}$ 184 over time 186, wherein the residual power $P_{res}$ 184 is reset every time interval $T_1$ 142 of 10 seconds, according to embodiments of the present disclosure. The timing diagram 180 includes a horizontal or x-axis representing time 186 in seconds and a vertical or y-axis representing transmission power 188 in decibel milliwatts (dBm). As illustrated, the residual power $P_{res}$ 184 may exceed 60 dBm, and may be reset each time interval $T_1$ 142 (e.g., 10 seconds) to a decreased or minimum value (e.g., 0), and increase time until the next reset at the end of a respective time interval $T_1$ 142.

FIG. 9B is a timing diagram 200 illustrating a dynamic power limit $P_{limit,i}$ 136 for a time interval $T_i$ 144 and an average power limit or $P_{limit,avg}$ 146 over time 186, where the residual power $P_{res}$ 184 is reset every time interval $T_1$ 142 of 10 seconds, according to embodiments of the present disclosure. The timing diagram 200 also includes a horizontal or x-axis representing time 186 in seconds and a vertical or y-axis representing transmission power 188 in dBm. As mentioned above, the average transmission power limit $P_{limit,avg}$ 146 may correspond to exposure requirements as promulgated by regulatory entities for the time interval T 140. As shown, the average transmission power limit $P_{limit,avg}$ 146 remains fixed or constant (e.g., set based on configuration of the electronic device 10, the network 82, regulatory requirements, and so on). On the other hand, the dynamic power limit $P_{limit,i}$ 136 changes over time, and is based on consumed power $C_p$ 182 and/or residual power $P_{res}$ 184. It should be noted that the residual power $P_{res}$ 184 shown in FIG. 9A is positive as the consumed power $C_p$ 182 is less than the average transmission power limit $P_{limit,avg}$ 146, which may be the case since the illustrated example is one of low duty cycle traffic. For example, to consume the $P_{limit,avg}$ 146, a high duty cycle scenario may be necessary, such that there is a full buffer of uplink traffic with a high allocated transmission power. As observed, in FIG. 9A, as the residual power $P_{res}$ 184 is reset each time interval $T_1$ 142, $P_{limit,i}$ 136 is also reset to a decreased or minimum value. As $P_{res}$ 184 increases over time within a time interval $T_1$ 142, so does $P_{limit,i}$ 136. As illustrated, for most of the time 186, $P_{limit,i}$ 136 is greater than the fixed average transmission power limit $P_{limit,avg}$ 146. The power difference between $P_{limit,i}$ 136 and $P_{limit,avg}$ 146 may be on the scale of 1 dBm or more, 5 dBm or more, 10 dBm or more, and so on. For example, the difference between $P_{limit,i}$ 136 and $P_{limit,avg}$ 146 may be approximately 1.5 dBm. Thus, employing the dynamic power limit $P_{limit,i}$ 136, as disclosed herein, may enable greater transmission power over time 186.

FIG. 9C is a timing diagram 210 illustrating the MTPL 114 that may be determined based on consumed power $C_p$ 182 and/or residual power $P_{res}$ 184 that is reset every time interval $T_1$ 142 of 10 seconds, and an MTPL 212 that may be determined without considering consumed power $C_p$ 182 and/or residual power $P_{res}$ 184, according to embodiments of the present disclosure. The timing diagram 200 also includes a horizontal or x-axis representing time 186 in seconds and a vertical or y-axis representing transmission power 188 in dBm. In particular, the MTPL 212 may be determined based on $P_{max}$ 138 and a $P_{min}$, which in turn may be determined based on the fixed average transmission power limit $P_{limit,avg}$ 146 shown in FIG. 9B. Because the MTPL 114 is based on $P_{min}$ 112, which is based on the dynamically determined $P_{limit,i}$ 136, which may be greater than the fixed average transmission power limit $P_{limit,avg}$ 146 over time 186, as shown in FIG. 9B, the MTPL 114 may be greater than the MTPL 212 over time 186. For example, the MTPL 114 may be as great as approximately 1.5 dBm over the MTPL 212 within the time 186 shown in FIG. 9C. Therefore, the processor 12 may enforce a higher MTPL 114 when considering the consumed power $C_p$ 182 than the MTPL 212, resulting in better uplink performance, while still complying w emission regulations.

Figure 10A:
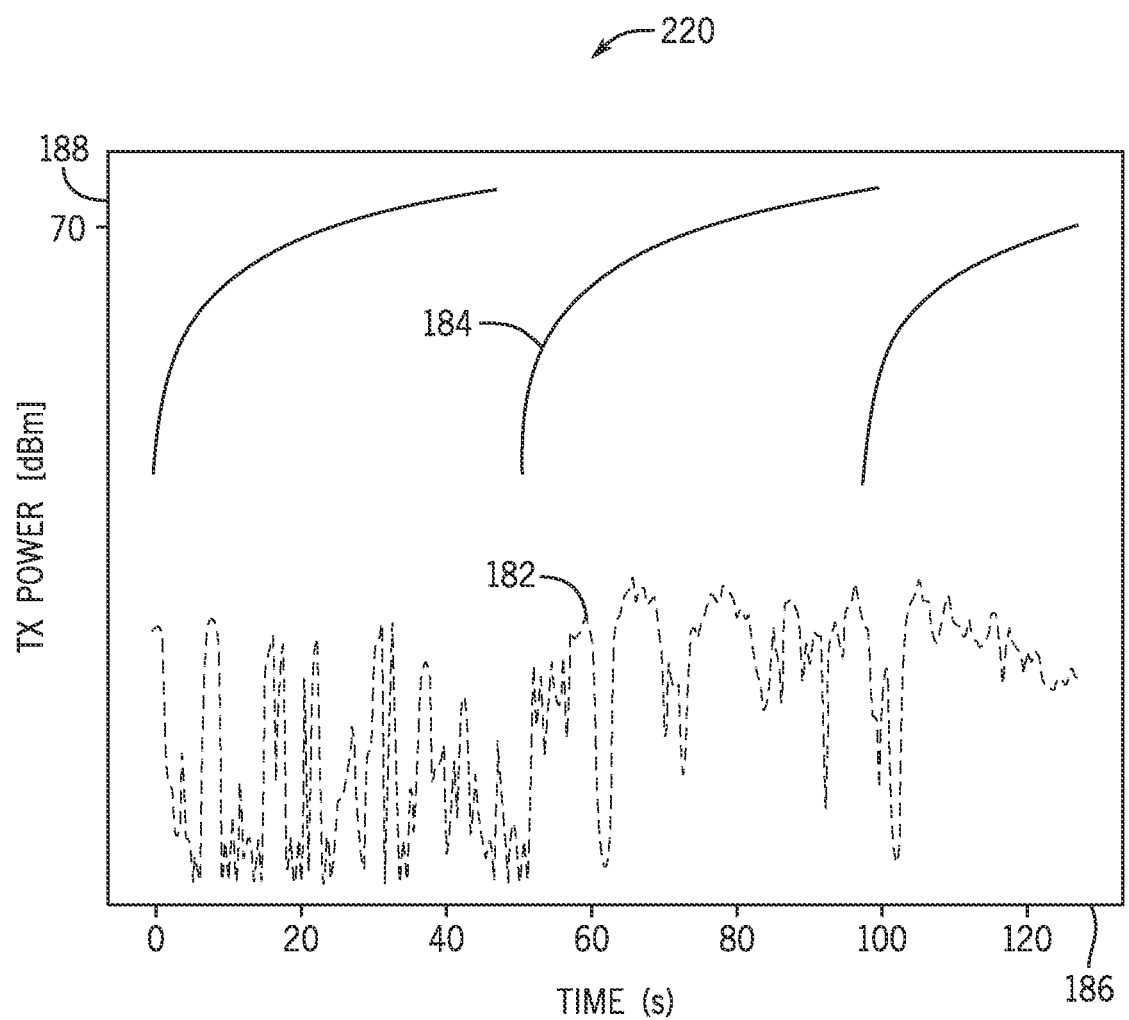
FIG. 10A is a timing diagram illustrating consumed power and residual power over time, wherein the residual power is reset every 50 seconds, according to embodiments of the present disclosure.
Figure 10B:
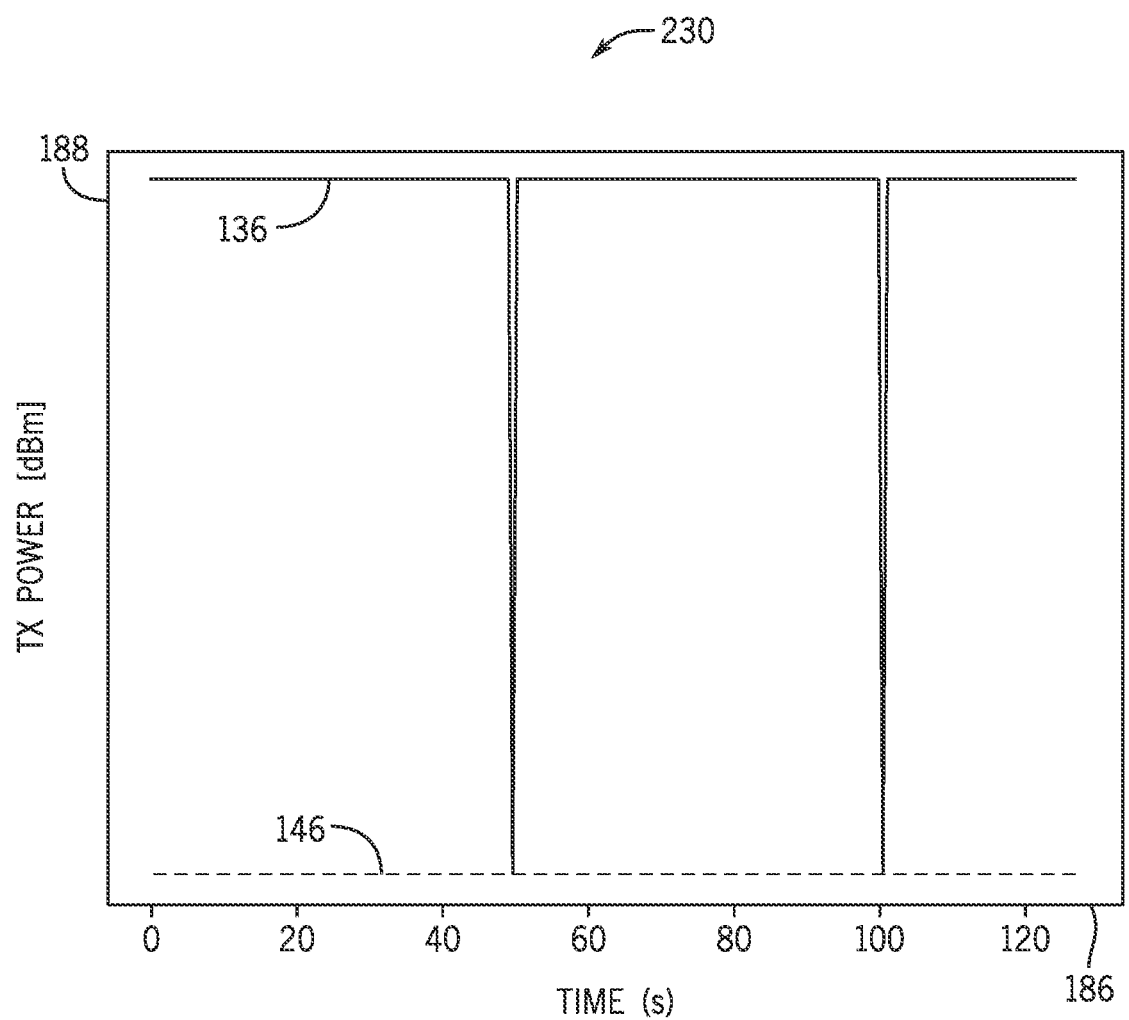
FIG. 10B is a timing diagram illustrating a dynamic power limit for a time interval $T_i$ and an average transmission power limit over time, where the residual power is reset every time 50 seconds, according to embodiments of the present disclosure.
Figure 10C:
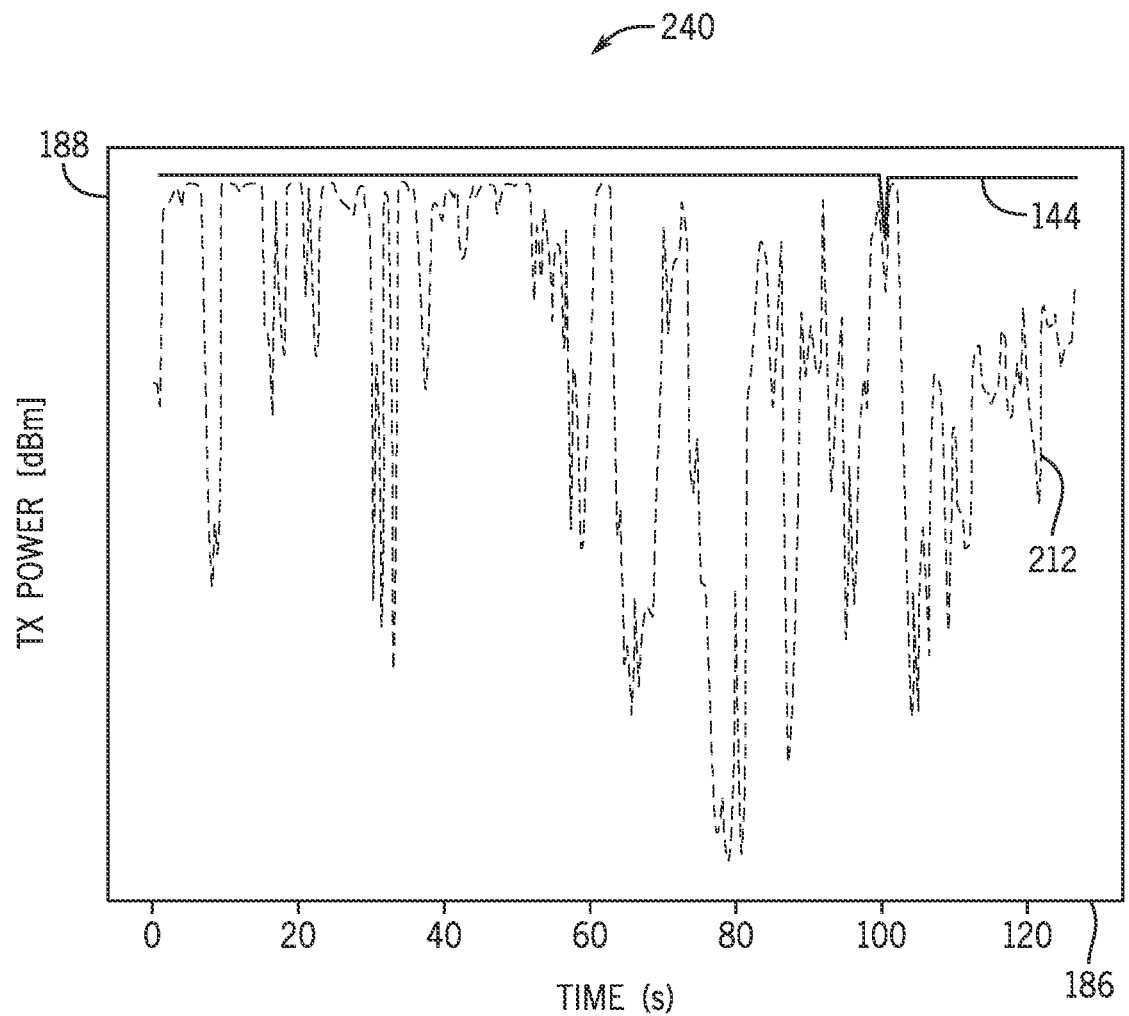
FIG. 10C is a timing diagram illustrating the MTPL that may be determined based on consumed power and/or residual power that is determined reset 50 seconds, and an MTPL that may be determined without considering consumed power and/or residual power, according to embodiments of the present disclosure.

FIGS. 10A-C illustrate operating characteristics when dynamically setting the MTPL 114 based on ongoing or previous transmission power consumed by the transmitter of FIG. 4 for a low traffic scenario, wherein the residual power $P_{res}$ 184 is reset every 50 seconds, according to embodiments of the present disclosure. That is, the time interval $T_1$ 142 is set at 50 seconds. FIG. 10A is a timing diagram 220 illustrating consumed power $C_p$ 182 and residual power $P_{res}$ 184 over time 186, wherein the residual power $P_{res}$ 184 is reset every time interval $T_1$ 142 of 50 seconds, according to embodiments of the present disclosure. The timing diagram 220 includes a horizontal or x-axis representing time 186 in seconds and a vertical or y-axis representing transmission power 188 in dBm. As illustrated, the residual power $P_{res}$ 184 may exceed 70 dBm, and may be reset each time interval $T_1$ 142 (e.g., 50 seconds) to a decreased or minimum value (e.g., 0), and increase time until the next reset at the end of a respective time interval $T_1$ 142.

FIG. 10B is a timing diagram 230 illustrating a dynamic power limit $P_{limit,i}$ 136 for a time interval $T_i$ 144 and an average transmission power limit $P_{limit,avg}$ 146 over time 186, where the residual power $P_{res}$ 184 is reset every time interval $T_1$ 142 of 50 seconds, according to embodiments of the present disclosure. The timing diagram 230 also includes a horizontal or x-axis representing time 186 in seconds and a vertical or y-axis representing transmission power 188 in dBm. As shown, the average transmission power limit $P_{limit,avg}$ 146 remains fixed or constant (e.g., set based on configuration of the electronic device 10, the network 82, regulatory requirements, and so on). On the other hand, the dynamic power limit $P_{limit,i}$ 136 changes over time, and is based on consumed power $C_p$ 182 and/or residual power $P_{res}$ 184. As observed, in FIG. 10A, as the residual power $P_{res}$ 184 is reset each time interval $T_1$ 142, $P_{limit,i}$ 136 is also reset to a decreased or minimum value. As $P_{res}$ 184 increases over time within a time interval $T_1$ 142, so does $P_{limit,i}$ 136. As illustrated, for most of the time 186, $P_{limit,i}$ 136 is greater than the fixed average transmission power limit $P_{limit,i}$ 146. The power difference between $P_{limit,i}$ 136 and $P_{limit,avg}$ 146 may be on the scale of 1 dBm or more, 5 dBm or more, 10 dBm or more, and so on. For example, the difference between $P_{limit,i}$ 136 and $P_{limit,avg}$ 146 may be approximately 1.5 dBm. Thus, employing the dynamic power limit $P_{limit,i}$ 136, as disclosed herein, may enable greater transmission power over time 186.

FIG. 10C is a timing diagram 240 illustrating the MTPL 114 that may be determined based on consumed power $C_p$ 182 and/or residual power $P_{res}$ 184 that is reset every time interval $T_1$ 142 of 50 seconds, and an MTPL 212 that may be determined without considering consumed power $C_p$ 182 and/or residual power $P_{res}$ 184, according to embodiments of the present disclosure. The timing diagram 240 also includes a horizontal or x-axis representing time 186 in seconds and a vertical or y-axis representing transmission power 188 in dBm. In particular, the MTPL 212 may be determined based on $P_{max}$ 138 and a $P_{min}$, which in turn may be determined based on the fixed average transmission power limit $P_{limit,avg}$ 146 shown in FIG. 10B. Because the MTPL 114 is based on $P_{min}$ 112, which is based on the dynamically determined $P_{limit,i}$ 136, which may be greater than the fixed average transmission power limit $P_{limit,avg}$ 146 over time 186, as shown in FIG. 10B, the MTPL 114 may be greater than the MTPL 212 over time 186. For example, the MTPL 114 may be as great as approximately 1.5 dBm over the MTPL 212 within the time 186 shown in FIG. 10C. Therefore, the processor 12 may enforce a higher MTPL 114 when considering the consumed power $C_p$ 182 than the MTPL 212, resulting in better uplink performance, while still complying w emission regulations.

When comparing FIGS. 9A and 10A, it can be seen that the residual power $P_{res}$ 184 is greater when the interval $T_1$ 142 for which the residual power $P_{res}$ 184 is reset is greater. For example, the residual power $P_{res}$ 184 may exceed 70 dBm when the interval $T_1$ 142 is 50 seconds, as shown in the timing diagram 220 of FIG. 10A, as opposed to the residual power $P_{res}$ 184 of the timing diagram 180 of FIG. 9A when the interval $T_1$ 142 is 10 seconds. While it may seem that the most effective approach may be to maximize the interval $T_1$ 142, there may be a tradeoff with how a modem (e.g., baseband modem) of the electronic device 10 enforces emission regulations (e.g., a SAR limit). In particular, the modem (e.g., which may be part of the processing circuitry 12 of the electronic device 10) may ensure that the transmission power of the transmitter 52 does not exceed the average transmission power limit or $P_{limit,avg}$ 146 for the time interval T 140. As noted above, the time interval T 140 for certain applications, such as FR1 of the 5G/NR specification may be 100 seconds, though any suitable time interval is contemplated. As such, in a worst case, the modem may prevent or block transmissions from the transmitter 52 when it determines that the average transmission power limit or $P_{limit,avg}$ 146 has been exceeded for the time period T 140, in order to comply with a SAR limit.

To avoid the modem preventing or blocking transmissions, which would negatively impact user experience of the electronic device, the processor 12 may decrease $T_1$ 142 to a smaller time period (e.g., 50 seconds or less, 40 seconds or less, 30 seconds or less, 20 seconds or less, 10 seconds or less, or so on). This issue may be caused by a lack of coordination between the processor 12 and the modem, as the processor 12 may be unaware of how the modem enforces the SAR limit, and be specifically unaware of when the time interval T 140 starts or ends. That is, in the case that time interval $T_1$ 142 is set too long, and an end of a first time interval $T_1$ 142 and a start of a second time interval $T_1$ 142 are both in a time interval T 140, and the end of the first time interval T1 142 and the start of the second time interval T1 142 have high power transmissions that cause the average transmission power limit or $P_{limit,avg}$ 146 in time period T 140 to exceed the SAR limit, then the modem may prevent outgoing transmissions and/or shut down to avoid exceeding the SAR limit. In some embodiments, the time interval $T_1$ 142 may be in the range of 30 seconds (e.g., 50 seconds or less, 40 seconds or less, 30 seconds or less, 20 seconds or less, 10 seconds or less, or so on), or be 50% or less, 40% or less, 30% or less, 20% or less, and so on, of the time interval T 140 for which the average transmission power limit or $P_{limit,avg}$ 146 is not to be exceeded as set forth by a regulatory entity. In particular, the processor 12 may set the time interval $T_1$ 142 to be long enough to carry over a suitable amount of power in the form of the residual power $P_{res}$ 184 from a previous time period $T_{i-1}$ 144 to a next time period $T_i$ 144 to provide efficient transmission, but not long enough to violate SAR limit in order to avoid modem/transmission shutdown.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. An electronic device, comprising:
  a transmitter; and
  processing circuitry communicatively coupled to the transmitter, the processing circuitry configured to
    receive an average transmission power limit for a time period;

determine a fallback transmission power for a subset time period of the time period based on adding the average transmission power limit and a residual transmission power resulting from a previous transmission;

determine a maximum transmission power limit for the subset time period based on the fallback transmission power and a duty cycle of an executing process; and cause the transmitter to transmit a signal using a transmission power not to exceed the maximum transmission power limit during the subset time period.

2. The electronic device of claim 1, wherein the processing circuitry is configured to determine the fallback transmission power based on an uplink traffic type.

3. The electronic device of claim 1, wherein the processing circuitry is configured to determine the fallback transmission power based on a maximum transmission power of the transmitter.

4. The electronic device of claim 1, wherein the processing circuitry is configured to estimate a past duty cycle of the executing process.

5. The electronic device of claim 4, wherein the processing circuitry is configured to predict the duty cycle of the executing process based on the past duty cycle of the executing process.

6. The electronic device of claim 1, wherein the processing circuitry is configured to determine the maximum transmission power limit for the subset time period based on a maximum transmission power of the transmitter, the fallback transmission power, the duty cycle of the executing process.

7. The electronic device of claim 1, wherein the processing circuitry is configured to determine the maximum transmission power limit for the subset time period by applying a ratio to a difference between a maximum transmission power of the transmitter and the fallback transmission power, the ratio being based on the duty cycle of the executing process.

8. A method, comprising:

receiving, at processing circuitry of a wireless communication device, an average transmission power limit for a time period;

transmitting, using a transmitter of the wireless communication device, a first signal at a first transmission power less than a first maximum transmission power limit during a first time interval, the first maximum transmission power limit being based on the average transmission power limit;

determining, using the processing circuitry, residual transmission power based on the first maximum transmission power limit and the first transmission power; and transmitting, using the transmitter, a second signal at a second transmission power less than a second maximum transmission power limit during a second time interval of the time period, the second maximum transmission power limit being based on a duty cycle of an executing process and a sum of the average transmission power limit and the residual transmission power.

9. The method of claim 8, wherein the residual transmission power comprises a difference between the first maximum transmission power limit and the first transmission power.

10. The method of claim 8, wherein the first maximum transmission power limit comprises the average transmission power limit.

11. The method of claim 8, wherein the time period comprises a plurality of subset time periods, a subset time period of the plurality of subset time periods comprising the first time interval and the second time interval, and transmission power used by the transmitter during the subset time period is less than or equal to the average transmission power limit.

12. The method of claim 11, wherein each subset time period of the plurality of subset time periods comprises 10 seconds or more.

13. The method of claim 8, comprising resetting, using the processing circuitry, the residual transmission power for a third time interval of the time period.

14. The method of claim 8, wherein the time period comprises 100 seconds or more.

15. The method of claim 8, wherein the first time interval and the second time interval each comprises 500 milliseconds or more.

16. The method of claim 8, wherein the second maximum transmission power limit is determined by applying the duty cycle to the sum.

17. One or more tangible, non-transitory, machine-readable media, storing instructions configured to cause processing circuitry to:

receive an average transmission power limit for a time period;

determine a minimum transmission power for a time interval of the time period based on adding the average transmission power limit and a residual transmission power from a previous signal;

determine a maximum transmission power limit for the time interval based on the minimum transmission power and a duty cycle of an executing process; and cause a transmitter to transmit a signal using a transmission power not to exceed the maximum transmission power limit during the time interval.

18. The one or more tangible, non-transitory, machine-readable media of claim 17, wherein the instructions are configured to cause the processing circuitry to cause the transmitter to transmit the previous signal using a previous transmission power not to exceed a previous maximum transmission power limit for a previous time interval, the previous maximum transmission power limit being different from the maximum transmission power limit.

19. The one or more tangible, non-transitory, machine-readable media of claim 18, wherein the residual transmission power comprises a difference between the previous transmission power and the previous maximum transmission power limit.

20. The one or more tangible, non-transitory, machine-readable media of claim 17, wherein the instructions are configured to cause the processing circuitry to determine the maximum transmission power limit for the time interval based on a linear relationship between a maximum transmission power of the transmitter, the minimum transmission power, and the duty cycle of the executing process.

* * * * *